Sept. 19, 1950     G. C. PITTENGER     2,522,634

POULTRY FEEDER

Filed Dec. 21, 1945

INVENTOR:
GLENN C. PITTENGER

BY

ATTORNEY

Patented Sept. 19, 1950

2,522,634

UNITED STATES PATENT OFFICE 2,522,634

POULTRY FEEDER

Glenn C. Pittenger, St. Louis, Mo., assignor to Ralston Purina Company, St. Louis, Mo., a corporation of Missouri Application December 21, 1945, Serial No. 636,328

2 Claims. (Cl. 119—53)

My invention relates to a poultry feeder of improved construction, its object being to secure the advantageous characteristics hereinafter described by a construction embodying a minimum number of parts which may be inexpensively made and assembled.

Figure 1:
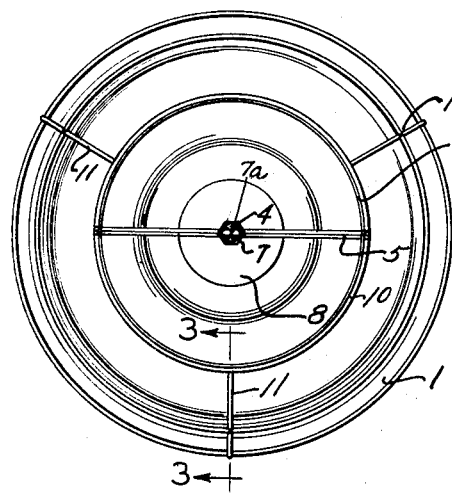
Figure 4:
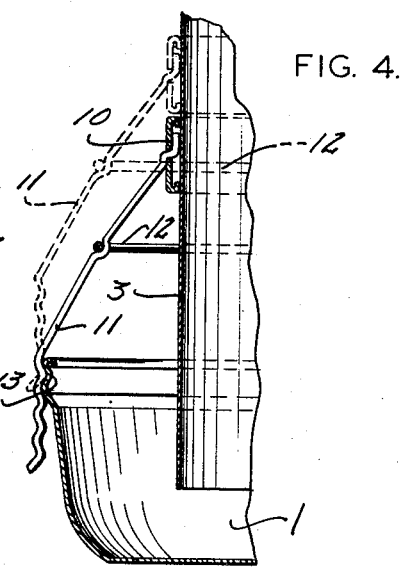
Figure 2:
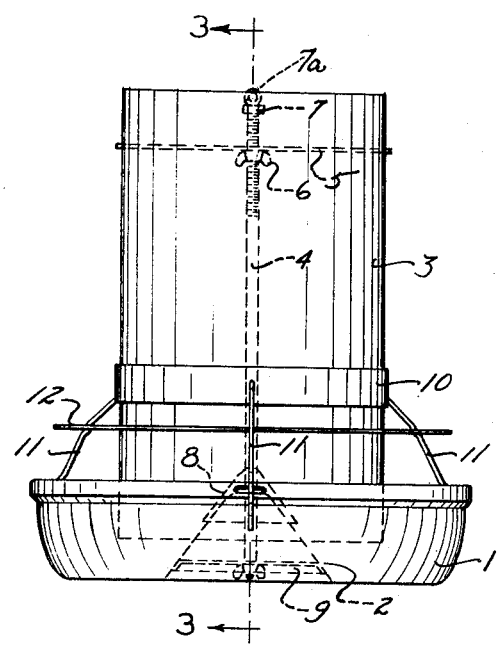
Figure 3:
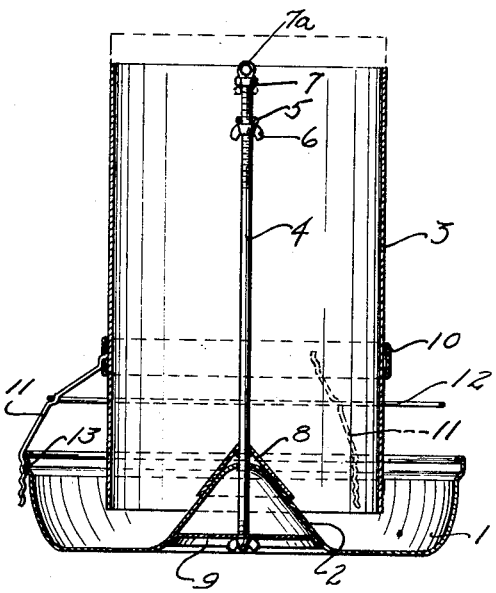

In the drawings Figure 1 is a top plan view and Figure 2 is a side elevational view of a poultry feeder embodying my invention; Figure 3 is a vertical section on the line 3—3 of Figure 2; and Figure 4 is an enlarged view of the means for adjusting the feed guard.

The feeder comprises a circular feed trough element 1 having the central portion of its bottom cone-shaped as indicated at 2. A feed reservoir 3 is supported by the central rod 4 by means of a cross-member 5 bearing on wing nut 6 which is in threaded relation with the upper part of the rod. A retainer nut 7, which is threaded on the tip of the rod, limits the upward movement of reservoir 3. The nut 7 is formed with an eye 7a for suspending the feeder, if desired. Secured to the supporting rod near its lower end is a cone-shaped clamping member 8 which bears on the upper surface of the cone portion of the trough member. The lower end of the rod passes through the central portion of the circular positioning plate 9 having a flanged periphery which bears on the lower surface of the cone portion of the trough member and may be clamped firmly thereagainst by means of the nut shown on the lower end of the rod. By the means just described the supporting rod 4 is rigidly held against movement in any direction with respect to the trough member. The lateral position of the lower end of the feed reservoir is fixed by means of the guide collar 10 which is vertically slidable with respect to said reservoir and which is mounted on the upper edge of the trough member by means of a plurality of spaced apart resilient wire arms 11. The lower ends of these arms are provided with a plurality of bends engageable with walls of depressed portions formed in the trough element (indicated at 13 in Figure 3) and by means of which the guide collar and the feed guard ring 12 carried on arms 11 may be vertically adjusted in order to so position the feed guard as to restrict, when desired, ready accessibility to the feed to poultry of particular size. The feed reservoir 3 is vertically adjustable by means of the wing nut 6 whereby an adjustable feed gate is formed between the lower edge of the reservoir and the bottom of the trough which determines the height at which the accessible portion of the feed in the trough will be maintained.

It will be observed that the feed guard may be vertically adjusted without changing the vertical position of the feed reservoir or impairing its function as a lateral positioning element for the lower end of said reservoir. Likewise the reservoir may be vertically adjusted without adjustment of said guard parts. The construction describes a form of durable inexpensive feeder embodying the desirable features of feed control and adjustability.

Having fully described my invention, that which I claim as novel and desire to protect by Letters Patent of the United States is:

1. A feeder comprising a feed trough, a rod fixed at its lower end within the trough and extending vertically upward therefrom, a rservoir-supporting element vertically adjustable on the upper part of the rod, a feed reservoir surrounding the rod and supported on said element, the reservoir opening at its bottom into the trough and being vertically adjustable relative to the trough by adjustment of said element, a guide collar around the lower part of the reservoir in sliding relation therewith for preventing lateral movement of the reservoir, said collar being mounted for vertical adjustment relative to the trough by means of a plurality of resilient arms extending downward from the collar and resiliently engaged adjacent their lower ends with the rim of the trough, and a feed guard element on said arms.

2. A feeder comprising a feed trough, a rod fixed at its lower end within the trough and extending vertically upward therefrom, a nut adjustably threaded on the upper part of the rod, a feed reservoir surrounding the rod and having a cross-member bearing on the nut, the reservoir opening at its bottom into the trough and being vertically adjustable relative to the trough by adjustment of the nut, a guide collar around the lower part of the reservoir in sliding relation therewith for preventing lateral movement of the reservoir, said collar being mounted for vertical adjustment relative to the trough by means of a plurality of resilient arms extending downward from the collar and having vertically spaced trough-engaging elements adjacent their lower ends selectively engageable with the rim of the trough, and a feed guard ring mounted on said arms.

GLENN C. PITTENGER.

(References on following page)

REFERENCES CITED

The following references are of record in the file of this patent:

UNITED STATES PATENTS

| Number | Name | Date |
|---|---|---|
| 137,390 | Stamberger | Apr. 1, 1873 |
| 900,851 | Hatch | Oct. 13, 1908 |
| 1,131,491 | Drake | Mar. 9, 1915 |
| 1,154,073 | Stocking | Sept. 21, 1915 |
| 1,347,425 | Wenger | July 20, 1920 |
| 1,384,785 | Shepard | July 19, 1921 |
| 1,561,871 | Lord | Nov. 17, 1925 |
| 1,623,840 | Kassy | Apr. 5, 1927 |
| 2,005,188 | Hedrick | June 18, 1935 |
| 2,316,427 | Hedrick | Apr. 13, 1943 |
| 2,429,777 | Smith | Oct. 28, 1947 |

FOREIGN PATENTS

| Number | Country | Date |
|---|---|---|
| 201,365 | Great Britain | Aug. 2, 1923 |
| 206,561 | Great Britain | Nov. 15, 1923 |
| 461,830 | Great Britain | Feb. 25, 1937 |
| 113,992 | Australia | Oct. 23, 1941 |